(12) United States Patent
Ishimaru

(10) Patent No.: US 7,564,036 B2
(45) Date of Patent: Jul. 21, 2009

(54) COMMUNICATION DEVICE FOR AN IMAGE PICKUP APPARATUS POSITIONED IN FRONT OF AN IMAGE SENSOR

(75) Inventor: Yoshiaki Ishimaru, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 84 days.

(21) Appl. No.: 11/393,011

(22) Filed: Mar. 30, 2006

(65) Prior Publication Data
US 2006/0219925 A1 Oct. 5, 2006

(30) Foreign Application Priority Data
Mar. 30, 2005 (JP) ............... 2005-099193

(51) Int. Cl.
*G01J 1/04* (2006.01)
(52) U.S. Cl. .............. 250/370.08; 250/353; 359/583
(58) Field of Classification Search ............ 250/370.08, 250/208.1; 359/583
See application file for complete search history.

(56) References Cited

U.S. PATENT DOCUMENTS

| 5,548,373 A * | 8/1996 | Ueda | 355/55 |
| 5,715,480 A * | 2/1998 | Nonaka | 396/59 |
| 6,580,453 B1 * | 6/2003 | Hirasawa | 348/211.99 |
| 6,710,320 B2 * | 3/2004 | Kurata | 250/208.1 |
| 7,119,318 B2 * | 10/2006 | Yoshimura | 250/208.1 |

FOREIGN PATENT DOCUMENTS

JP 6-22194 A 1/1994

* cited by examiner

*Primary Examiner*—David P Porta
*Assistant Examiner*—Yara B Green
(74) *Attorney, Agent, or Firm*—Sughrue Mion, PLLC

(57) ABSTRACT

A communication device for an image pickup apparatus having its imaging lens focussing light input from a field on an image sensor uses infrared rays. An infrared ray receiving member is positioned in front of the image sensor for receiving infrared rays contained in the light transmitted through the lens. A detecting circuit detects a signal exclusive for communication contained in the infrared rays received. The infrared rays receiving member transmits visible rays so that the visible rays are incident on the image sensor.

13 Claims, 2 Drawing Sheets

US 7,564,036 B2

COMMUNICATION DEVICE FOR AN IMAGE PICKUP APPARATUS POSITIONED IN FRONT OF AN IMAGE SENSOR

BACKGROUND OF THE INVENTION

1. Field of the Invention

The present invention relates to a communication device of the type using infrared rays and applicable to a still camera, video camera or similar image pickup apparatus configured to focus incident light representative of a field on an image sensor via a lens system.

2. Description of the Background Art

It is a common practice with a still camera, video camera or similar image pickup apparatus to use a remote controller or remote-control unit emitting infrared rays to thereby control, e.g., its image-shooting operation. A remote controller or remote-control signal generating device using infrared rays converts an electric control signal to a remote-control signal on an infrared beam and emits the infrared beam toward an image pickup apparatus. The infrared beam thus emitted is incident on a sensor included in the image pickup apparatus and thereby converted back to a corresponding electric remote-control signal. The remote-control signal output from the sensor is decoded into a control signal by a controller also included in the image pickup apparatus. Various circuits arranged in the image pickup apparatus are controlled to, e.g., shoot a scene in response to the control signal.

Japanese patent laid-open publication No. 22194/1994, for example, discloses an image pickup apparatus including an optical filter positioned in front of an image sensor for cutting infrared rays off. When a remote-control signal or infrared signal is emitted from an infrared remote-control unit to the image pickup apparatus, the optical filter is moved out of an optical path so as to permit the remote-control signal to be incident on the image sensor. In this sense, the image sensor itself functions as an infrared ray receiver. This, however, brings about a drawback that the optical filter used to cut infrared rays off must be movable to and from the optical path extending to the image sensor by a mechanism exclusive thereto, sophisticating the construction of the image pickup apparatus.

SUMMARY OF THE INVENTION

It is an object of the present invention to provide a communication device for an image pickup apparatus capable of obviating the need for a mechanism exclusive to moving an infrared ray cutting filter out of its optical path.

It is another object of the invention to provide a communication device for an image pickup apparatus in which a distance is extended over which infrared rays emitted from a remote-control unit can be propagated to the image pickup apparatus.

A communication device of the present invention for an image pickup apparatus having a lens configured to focus light input from a field on an image sensor uses infrared rays. In front of the image sensor, an infrared ray receiving member is positioned for receiving infrared rays contained in the light transmitted through the lens. A signal exclusive for communication contained in the infrared rays received is detected by a detecting circuit. The infrared ray receiving member transmits visible rays so that the visible rays are allowed to be incident on the image sensor.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

With reference to the accompanying drawings, a preferred embodiment of the image pickup apparatus will be described hereinafter in accordance with the present invention, which is implemented as a digital still camera by way of example. Briefly, in accordance with the present invention, the digital still camera includes an infrared ray cutting or removing filter positioned in front of an image sensor for reflecting infrared rays, and a photo-sensitive device so positioned as to receive infrared rays reflected by the filter. The infrared rays incident on the photo-sensitive device are amplified and then detected to restore the original control signal. Subsequently, an image-shooting operation, for example, is controlled by a microcomputer in response to the control signal.

The infrared ray cutting filter of the illustrative embodiment is adapted to reflect an infrared signal. Such a filter may however be replaced with a filter that is adapted to absorb an infrared signal while transmitting visible rays. In the latter case, a control signal is produced from infrared rays absorbed with the visible rays transmitted to be incident on an image sensor.

In accordance with the present invention, the infrared ray cutting filter is located in front of the image sensor for the following reason. Generally, infrared rays are higher in refractive index than visible rays and therefore focussed at a point short of the image sensor. In the case of a group photograph, for example, when a person belonging to the group operates a remote controller, the inventive structure allows infrared rays emitted from the remote controller to be focussed at an optimum position for the infrared cutting filter, thus accomplishing operating conditions optimum for the remote controller.

Figure 1:
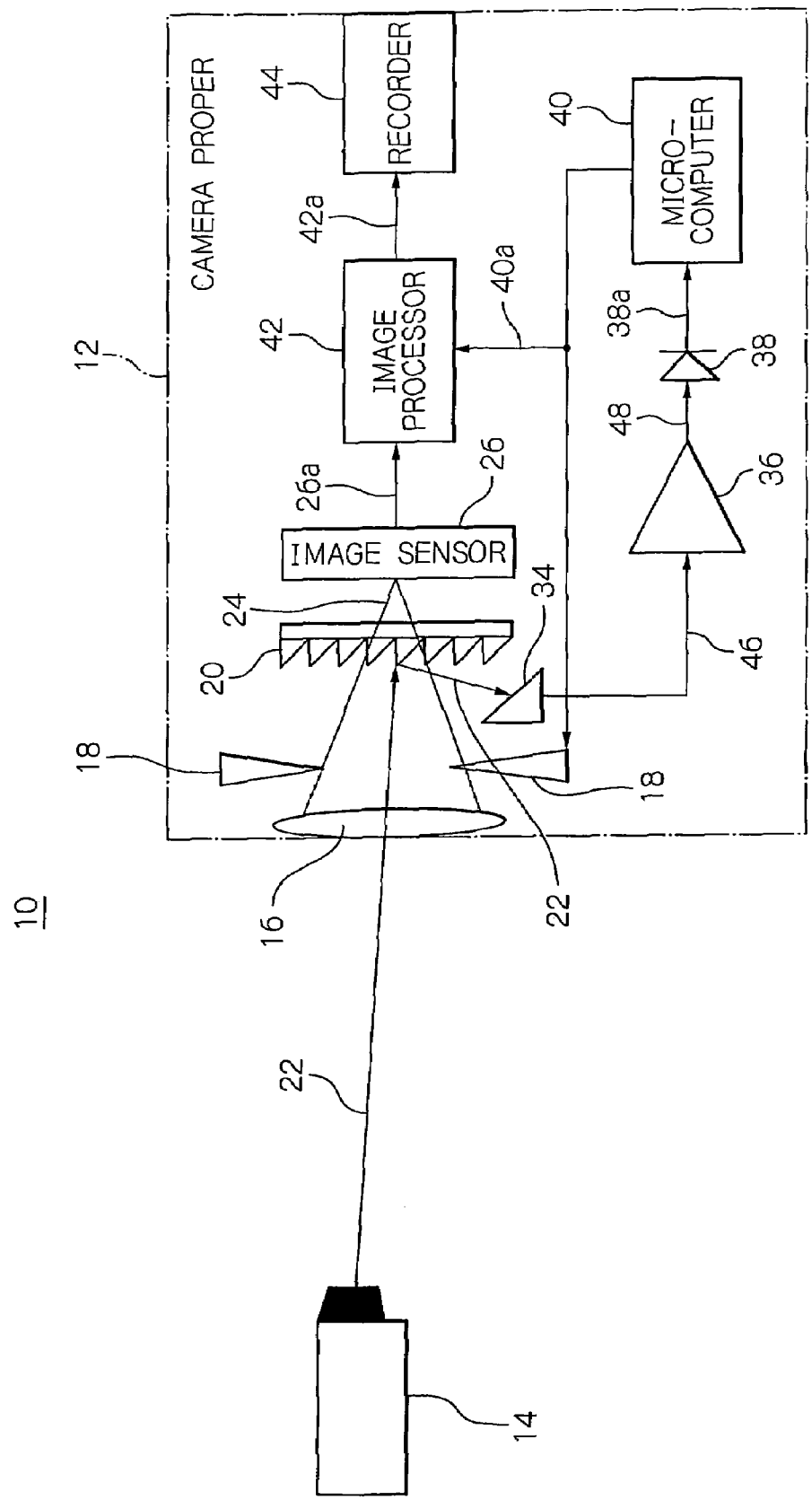
FIG. 1 is a schematic block diagram showing a preferred embodiment of the image pickup apparatus in accordance with the present invention.

Referring to FIG. 1 of the drawings, the digital still camera embodying the present invention will be described more specifically. As shown, the digital still camera, generally 10, is made up of a camera body or proper 12 and a conventional, infrared remote controller or remote control unit 14. The remote controller 14 is adapted to convert a digital control signal to a corresponding infrared signal 22 and emits the infrared signal 22 toward the camera proper 12 as conventional. The control signal is indicative of, e.g., a shooting operation or a reproducing operation.

Generally, the infrared remote controller 14 modulates the control signal by using a PPM (Pulse Position Modulation) system, so that the control signal is output in the form of digital signal selectively represented by (logical) ZERO or (logical) ONE. With a PPM system applied to household appliances, the above digital signal is modulated with a signal whose frequency lies in the range of from 33 kHz to 40 kHz. The digital signal thus modulated is fed to an infrared light-emitting diode, not shown, included in the infrared remote controller 14 with the result that the light-emitting diode emits the infrared signal 22 in the form of infrared rays.

The infrared signal 22 thus emitted from the infrared remote controller 14 is received by the camera proper 12. It should be noted that part of the camera proper 12 only relevant to the understanding of the present invention is shown in FIG. 1. The infrared signal 22 is transmitted through a lens 16, restricted by a shutter 18 and then incident on an infrared ray reflecting or cutting filter (simply referred to as filter hereinafter) 20, which is a specific form of infrared ray receiving means.

Figure 2:
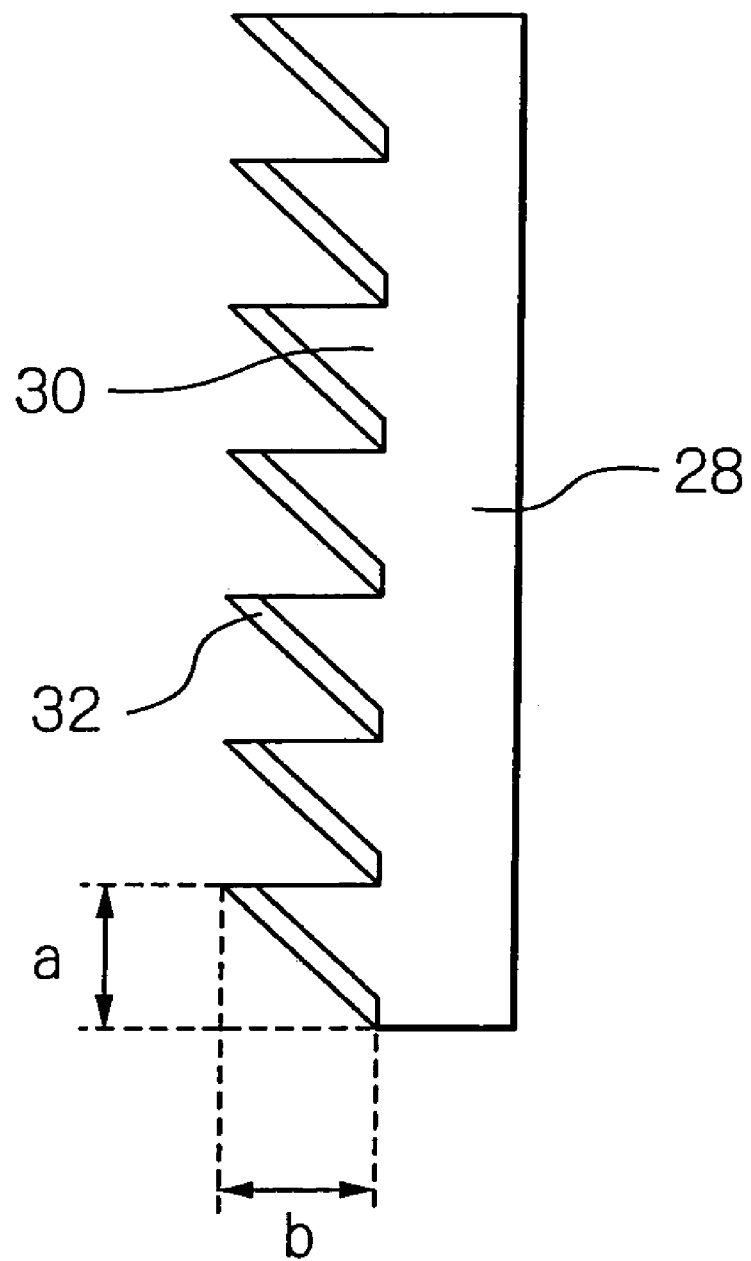
FIG. 2 shows in a side elevation view a specific configuration of a filter included in the illustrative embodiment for reflecting infrared rays.

The filter 20 is located at a position where the infrared signal 22 reaching the camera proper 12 is focussed by the lens 16. The infrared rays 22 are higher in refractive index than visible rays 24 transmitted through the filter 20 and are focussed at a position short of an image sensor 26. The image sensor 26 may be a solid-state imaging device having its photosensitive array, now shown, disposed to capture a subject optical image of an imaging field conveyed on the light incident thereon. The visible rays 24 are focussed at the position of the photosensitive array of the image sensor 26. The filter 20 thus functions as reflecting the infrared signal 22 to thereby cut infrared rays while transmitting visible rays therethrough. The filter 20 is disposed to cover the entire surface of the photosensitive array of the image sensor 26, FIG. 2 shows in a side elevation view a specific configuration of the filter 20. As shown, the filter 20 includes a base portion 28 formed with a number of sawtoothed reflecting portions or segments 30 parallel to each other on one of the opposite major surfaces thereof. A reflection film 32 is formed on each reflecting portion 30. Each reflecting portion or sawtooth 30 has its bottom having a length a and has its height b. The length a and height b may be 50 micrometers each by way of example. In the figures, the filter 20 is illustrated with its horizontal dimension in the figures emphasized with respect to its vertical dimension. In practice, there are much more sawteeth than depicted.

The base portion 28 and reflecting portions 30 are implemented integrally by a single resin film formed with the sawtoothed reflecting portions 30. The reflection film 32 formed on the reflecting portions 30 is made of tin oxide doped with antimony oxide, indium oxide doped with tin oxide or similar electro-conductive metal oxide which reflect infrared rays while transmitting visible rays. The film 32 may be fabricated by using sputtering or similar technology. A specific sputtering process consists of tin oxide doped with antimony oxide or indium oxide doped with tin oxide as a target and then forming the 50-micrometer thick reflection film 32 of conductive metal oxide on the resin film 30 by DC sputtering in a 30% or less oxygen atmosphere.

Referring again to FIG. 1, the infrared signal 22 reflected by the filter 20 is input to a detecting circuit or detecting means for detecting a signal exclusive for communication out of the infrared signal 22. In the illustrative embodiment, the detecting circuit is made up of an infrared-sensitive device 34, an amplifier 36 and a detector 38. The infrared-sensitive device 34 is implemented by a photodiode that converts the output current of the received infrared signal 22 to a weak electric voltage signal 46.

Because the signal 46 thus output from the photodiode 34 is extremely small, the amplifier 36 having its gain high is provided to amplify the signal 46. Further, a band-pass filter, not shown, with its center frequency equal to, e.g., 38 kHz is arranged to cancel noise contained in the resulting amplified signal. By so setting the center frequency of 38 kHz, it is possible to receive only the remote-control signal. Subsequently, the detector 38 is arranged to convert the received signal 48 to a pulse waveform for thereby restoring the original control signal 38a and feeds the control signal 38a to a microcomputer 40.

The microcomputer 40 is provided to be responsive to the control signal 38a to deliver operation commands 40a to the various sections of the camera proper 12. The operation commands include ones relating to the operations of the aperture of a shutter 18 and an image processor 42. The image processor 42 is adapted to receive an image signal 26a from the image sensor 26 and execute gamma correction and other conventional image processing on the image signal 26a. More specifically, the image signal 26a is an electric signal resultant from the image sensor 26 converting the visible rays 24 transmitted through the filter 20.

The image processor 42 feeds a signal 42a subjected to gamma correction and other processing to a recorder 44, so that the signal 42a is recorded in the recorder 44.

As stated above, in the illustrative embodiment, infrared rays are focussed on the filter 20 itself or a position short of it, thus utilizing the focussing power of the lens 16 for enhancing the intensity of the infrared rays. With this configuration, the illustrative embodiment successfully extends the distance over which infrared rays can be propagated from the remote controller 14 to the camera proper 12, and implements an infrared signal receiving function without affecting the image pickup function of the image sensor 26.

If desired, infrared ray receiving means and an infrared ray cutting filter can be provided separately. For example, the infrared rays receiving means can be located in front of the infrared ray cutting filter. It is, however, desirable to provide such infrared ray receiving means bifunctioning as the infrared ray cutting filter at the same time because it saves a space to be allocated thereto in the camera proper. In addition, infrared rays are undesirable for an image sensor which is originally designed to receive visible rays. With the embodiment, therefore, the infrared rays thus cut of can be effectively used for the remote control function.

In summary, in accordance with the present invention, infrared rays are incident on an infrared ray cutting filter itself or focussed on a position short of it while being intensified by the focussing force of an imaging lens. This is successful to extend a distance over which infrared rays can be propagated from a remote controller to an image pickup apparatus, and implements an infrared signal receiving function without affecting the image pickup function of an image sensor.

The entire disclosure of Japanese patent application No. 2005-099193 filed on Mar. 30, 2005, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A communication device using infrared rays for use in an image pickup apparatus having a lens focusing light input from a field on an image sensor, comprising:

an infrared rays receiving member positioned in front of the image sensor for receiving infrared rays contained in the light transmitted through the lens, wherein the infrared receiving member is configured to reflect an infrared signal; and a detecting circuit for detecting a signal exclusive for communication contained in the received and reflected infrared rays;

said infrared rays receiving member transmitting visible rays to thereby cause the visible rays to be incident on the image sensor, wherein the infrared rays receiving portion comprises a base portion with a plurality of reflective saw tooth portions parallel to each other formed on the surface where the infrared rays are received.

2. The communication device in accordance with claim 1, wherein said infrared rays receiving member is located at a position on which the lens focuses the infrared rays.

3. The communication device in accordance with claim 2, wherein the lens focuses the infrared rays in a position short of the image sensor.

4. The communication device in accordance with claim 2, wherein the lens focuses the visible rays on the image sensor.

5. The communication device in accordance with claim 1, wherein said infrared rays receiving member comprises an infrared ray cutting filter for preventing the infrared rays from being incident on the image sensor.

6. The infrared rays receiving member in accordance with claim 1, wherein the saw tooth portions have a predetermined length and height.

7. The communication device in accordance with claim 1, wherein the image sensor converts the visible rays transmitted through the infrared rays receiving member into an image signal.

8. The communication device in accordance with claim 7, wherein image processing is performed based on the image signal.

9. The communication device in accordance with claim 7, wherein the image signal is an electric signal.

10. A system for controlling a communication device using infrared rays for use in an image pickup apparatus having a lens focusing light input from a field on an image sensor, comprising:

a first source for emitting visible rays;

a second source for emitting the infrared rays;

an infrared rays receiving member positioned in front of the image sensor for receiving the infrared rays contained in the light transmitted through the lens; and a detecting circuit for detecting a signal exclusive for communication contained in the infrared rays received;

said infrared rays receiving member transmitting the visible rays to thereby cause the visible rays to be incident on the image sensor, wherein the infrared rays and the visible rays are emitted from separate sources, wherein the second source is a remote control and wherein the first source is an object to be imaged, and wherein the infrared rays receiving portion comprises a base portion with a plurality of reflective saw tooth portions parallel to each other formed on the surface where the infrared rays are received.

11. The infrared receiving member in accordance with claim 10, wherein the infrared rays receiving member receives one of the infrared rays and the visible rays at each moment in time.

12. The infrared receiving member in accordance with claim 10, wherein the infrared rays of the second source comprise commands controlling the image pickup apparatus.

13. The infrared receiving member according to claim 12, wherein the commands are provided to a controller of the image pickup apparatus to adjust the image pickup apparatus and are not applied directly to the image obtained.

* * * * *